United States Patent
Friedman et al.

(10) Patent No.: US 6,557,040 B1
(45) Date of Patent: Apr. 29, 2003

(54) PROVIDING FOR THE OMISSION OF ROOT INFORMATION FROM DEPTH-RELATED REQUESTS ACCORDING TO STANDARD REQUEST/RESPONSE PROTOCOLS

(75) Inventors: Gregory S. Friedman, Redmond, WA (US); Alexander I Hopmann, Seattle, WA (US); Lisa M. Lippert, Seattle, WA (US); Lauren Antonoff, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/360,503

(22) Filed: Jul. 26, 1999

(51) Int. Cl.[7] .............................................. G06F 15/16
(52) U.S. Cl. ...................... 709/230; 709/201; 709/203; 709/226; 709/229; 709/245; 707/501; 707/514
(58) Field of Search ................................. 709/200–203, 709/225–226, 228–229, 230, 250, 245–246, 316–317; 707/100–104, 501, 513–514, 10

(56) References Cited

U.S. PATENT DOCUMENTS

| | | | | |
|---|---|---|---|---|
| 5,491,822 A | * | 2/1996 | Allen et al. | 709/316 |
| 5,600,826 A | * | 2/1997 | Ando | 707/103 |
| 6,067,558 A | * | 5/2000 | Wendt et al. | 709/202 |
| 6,243,396 B1 | * | 6/2001 | Somers | 709/202 |
| 6,356,920 B1 | * | 3/2002 | Vandersluis | 707/501 |
| 6,408,336 B1 | * | 6/2002 | Schneider et al. | 709/229 |

OTHER PUBLICATIONS

HTTP Working Group Internet Draft dated Nov. 18, 1998, prepared by Fielding, et al., [Chapter 1 is specifically provided].

W3C Recommendation REC–xml–1998–0210 dated Feb. 10, 1998.

E. James Whitehead Jr., World–Wide–Web Distributed Authoring and Versioning (WebDAV): An Introduction, in StandardView, vol. 5, No. 1, Mar. 1997, pp. 3–8.

(List continued on next page.)

Primary Examiner—Bharat Barot
(74) Attorney, Agent, or Firm—Workman, Nydegger & Seeley

(57) ABSTRACT

Depth-related requests without root-level information or actions according to standard request-response protocols such as HTTP are disclosed. For example, in one embodiment, a method specifies a request, such as a PROPFIND command, for application against a collection, such as a hierarchy of folders. Within a DEPTH header of the request, the method includes a NOROOT token to indicate that root-level information of the collection is unwanted. The request is then output, according to a predetermined transport protocol such as HTTP. In one embodiment, the outputting of the command is also according to a predetermined markup language, such as XML.

21 Claims, 4 Drawing Sheets

OTHER PUBLICATIONS

Internet Engineering Task Force (IETF) Request for Comment (RFC) 2518, entitled HTTP Extensions for Distributed Authoring, by Y. Goland, E. Whitehead, A. Faizi, S. Carter and D. Jensen, dated Feb. 1999.

ISO/IEC 9075:1992, Database Language SQL, Jul. 30, 1992, available from and produced by the International Organization for Standardization (ISO) in liason with the International Electrotechnical Commission (IEC), specifically the Joint Technical Committee ISO/IEC JTC1, Information Processing Systems. [Introduction is specifically provided].

Chris Date and Hugh Darwen, A Guide to the SQL Standard: A User's Guide to the Standard Database Language SQL, Apr. 1997, ISBN 0201964260.

Internet Web Site microsoft.com/data/oledb/, last updated Mar. 17, 1999.

Internet Web Site microsoft.com/data/oledb/oledb20/, printed Jul. 23, 1999.

Internet Web Site microsoft.com/com/, printed Jul. 23, 1999.

Internet Web Site microsoft.com/com/about.asp, printed Jul. 23, 1999.

Network Working Group Request for Comment (RFC) 1738 entitled Uniform Resource Locators (URL), by T. Berners-Lee, L. Masinter, M. McCahill, dated Dec. 1994.

Network Working Group Request for Comment (RFC) 2396 entitled Uniform Resource Identifiers (URI): Generic Syntax, by T. Berners-Lee, R. Fielding, L. Masinter, dated Aug. 1998.

* cited by examiner

PROVIDING FOR THE OMISSION OF ROOT INFORMATION FROM DEPTH-RELATED REQUESTS ACCORDING TO STANDARD REQUEST/RESPONSE PROTOCOLS

FIELD OF THE INVENTION

This invention relates generally to standard request-response protocols such as the HyperText Transport Protocol (HTTP), and more specifically to providing for depth-related requests without root information or actions according to such standard request-response protocols.

BACKGROUND OF THE INVENTION

The HyperText Transport Protocol (HTTP) has emerged as the standard mechanism by which information is transported over TCP/IP (Transmission Control Protocol/Internet Protocol) compatible networks, such as the Internet, intranets, and extranets. HTTP is more specifically an application-level protocol for distributed, collaborative, hypermedia information systems. It is a generic, stateless, protocol that can be used for many tasks beyond its use for hypertext, such as name servers and distributed object management systems, through extension of its request methods, error codes and headers. It is referred to as a transport protocol, since information is transported according to its specifications, and is also referred to as a request-response protocol, since information is exchanged by a client making a request of a server, which generates a response thereto. HTTP as referred to herein refers generally to any standard of HTTP, and specifically to HTTP/1.1, as described in the HTTP Working Group Internet Draft dated Nov. 18, 1998, prepared by Fielding, et al., and available on the web site htt://www.w3.org.

A common use of HTTP is the transport of information formatted according to a markup language. For example, a popular application of the Internet is the browsing of world-wide-web pages thereof. In such instances, typically the information retrieved is in HyperText Markup Language (HTML) format, as transported according to HTTP. However, other standard markup languages are emerging. One such markup language is eXtensible Markup Language (XML). XML describes a class of data objects that are referred to as XML documents, and partially describes the behavior of computer programs that process them. A primary difference between HTML and XML is that within the former, information content is intertwined with the layout of the content, making their separation difficult, for example. Conversely, within XML a description of the storage layout and logical structure of content is maintained separate from the content itself. However, both XML and HTML are derivatives of a markup language known as Standard Generalized Markup Language (SGML). XML as referred to herein refers generally to any standard of XML, and specifically to XML 1.0, as described in the W3C recommendation REC-xml-19980210 dated Feb. 10, 1998, and also available on the web site http://www.w3.org.

HTTP, and hence XML in the context of HTTP, allows for client computers to access resources that exist on server computers. The term resource refers to any piece of information that has a location described by a Uniform Resource Locator (URL), which commonly can be expressed in the form HTTP://<domain>.<extension>, where <domain> specifies a particular domain, and <extension> can be, for example, .com, .edu, and .net, among others. A resource can be, for example, a Web page, a hierarchical collection of information such as folders, a document, a database, a bitmap image, or a computational object. HTTP is a "verb-based" protocol. Verbs operate on resources. HTTP/1.1 describes a small set of verbs (e.g., GET, POST, PUT) that enable clients to retrieve resources from servers and to put resources onto servers, but not to perform granular manipulations of the objects on the server. Recently, extensions to HTTP have been proposed that allow for more granular queries of resources. For example, using the recently proposed PROPFIND extension, a client may send a request to a server asking the server to return descriptive information about the resources contained on the server. The server's response will contain a comprehensive summary of all of the resources contained within a specific hierarchy as well as specific property values associated with the resources. A property is specifically a name/value pair that contains descriptive information about a resource. More generally, a property is any information about a resource. An example of a property associated with a resource might be the "author" of the resource or the most recent "date of modification" of the resource. Other recently proposed extensions enable clients to send requests to servers instructing the server to delete properties of resources, create new collections of objects, move or copy objects, etc.

One set of extensions allowing for more granular queries of resources are generally referred to as the World-Wide-Web Distributed Authoring and Versioning (WebDAV) extensions to HTTP. The goal of WebDAV, broadly speaking, has been to add remote authoring capabilities to HTTP, so that HTTP can be more convenient as a readable and writable collaborative medium, and not necessarily only a browsing medium for web pages. WebDAV is generally described in the reference E. James Whitehead, Jr., World-Wide-Web Distributed Authoring and Versioning (WebDAV): An Introduction, in StandardView, Vol. 5, No. 1, March 1997, pages 3–8. The part of WEBDav that describes the setting and enumerating of properties is described in the reference Internet Engineering Task Force (IETF) Request for Comment (RFC) 2518, entitled HTTP Extensions for Distributed Authoring, by Y. Goland, E. Whitehead, A. Faizi, S. Carter and D. Jensen, and dated February 1999. More generally, this reference specifies a set of methods, headers and content-types ancillary to HTTP/1.1 for the management of resource properties, creation and management of resource collections, name space manipulation, and resource locking (also referred to as collision avoidance).

A limitation to these extensions that provide for more granular queries, primarily in the context of the PROPFIND command, is that the responses to the queries typically always provide root-level information, which may not be wanted. Root-level information refers to information regarding the immediate level of a hierarchical collection specified. For example, a hierarchy of folders may have three levels: a first level at the very top of the hierarchy including one folder, a middle level of the children folders of the top-level folder, and a bottom level of children folders of the middle level of folders. A request asking for properties of this hierarchical collection may specify a folder in the middle level, in which case the folder in this level is the root level of the request. Another request may ask for properties by specifying the folder at the top level, in which case this level is the root level of the request. When making such a request, information regarding the root level is always returned, even if it is unwanted. There is no manner by which to specify that such root-level information is not wanted to be returned within a request.

This means that a client receiving such information from a server must remove this information, which adds to the processing burden of the client, as well as to the processing burden of the server in generating this information. This latter burden can affect scalability of the server. Furthermore, transmission of this information across a network unduly clogs the bandwidth of the network, since the information itself is not used by the client but still is transmitted. For these and other reasons, there is a need for the present invention.

SUMMARY OF THE INVENTION

The invention provides for depth-related requests without root-level information or actions according to standard request-response protocols such as HTTP. For example, in one embodiment, a method specifies a request, such as a PROPFIND command, for application against a collection, such as a hierarchy of folders. Within a DEPTH header of the request, the method includes a NOROOT token to indicate that root-level information of the collection is unwanted, or to indicate that root-level action upon the collection is unwanted. (It is noted that headers can be optionally included in the request, and have semantic meanings that are defined by the protocol. The function of headers generally is to modify the nature of the request.) The request is then output, according to a predetermined transport protocol such as HTTP. In one embodiment, the outputting of the command is also according to a predetermined markup language, such as XML. By outputting the request, the method may send the request from a client to a server over a network such as the Internet, an intranet, or a network. A server can then respond to the client, and not provide the root-level information, since the client specifically requested that it did not want this information.

Embodiments of the invention therefore provide for advantages not found in the prior art. Computers coupled to TCP/IP-compliant networks such as the Internet, intranets, and extranets can generate depth-related requests of resources accessible on these types of networks, and specifically request that root-level information not be provided. For example, a client request may specify a DEPTH header with the NOROOT token against a hierarchical directory of folders beginning with the top-level folder to indicate that root-level information regarding the top-level folder need not be returned by the server responding to the request. Because Internet connectivity is becoming increasingly standard for computers, this means that that the invention provides for improved usefulness of the Internet as a readable and writable collaborative medium.

The invention also has advantages to shortcomings in the prior art not described in the background section. For example, the NOROOT extension is useful when a computer is attempting to perform a change operation on a hierarchy. If the client desires to MOVE all the resources in a collection to another collection, but not move the collection itself, this can only be accomplished in the prior art by issuing a separate MOVE request for each resource, which is inconvenient and time-consuming. However, under the invention, it is possible to issue a command only to the children of a collection, and not to the collection itself—thus reducing the cost of the scenario to a single request. That is, as substantially described herein, the invention is described as applicable to situations where root-level information is not desired. However, the invention is also equally applicable to situations where root-level actions are not desired, as can be appreciated by those of ordinary skill within the art. The invention is inclusive both of the case where root-level information is not desired, as well as the case where root-level actions are not desired.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
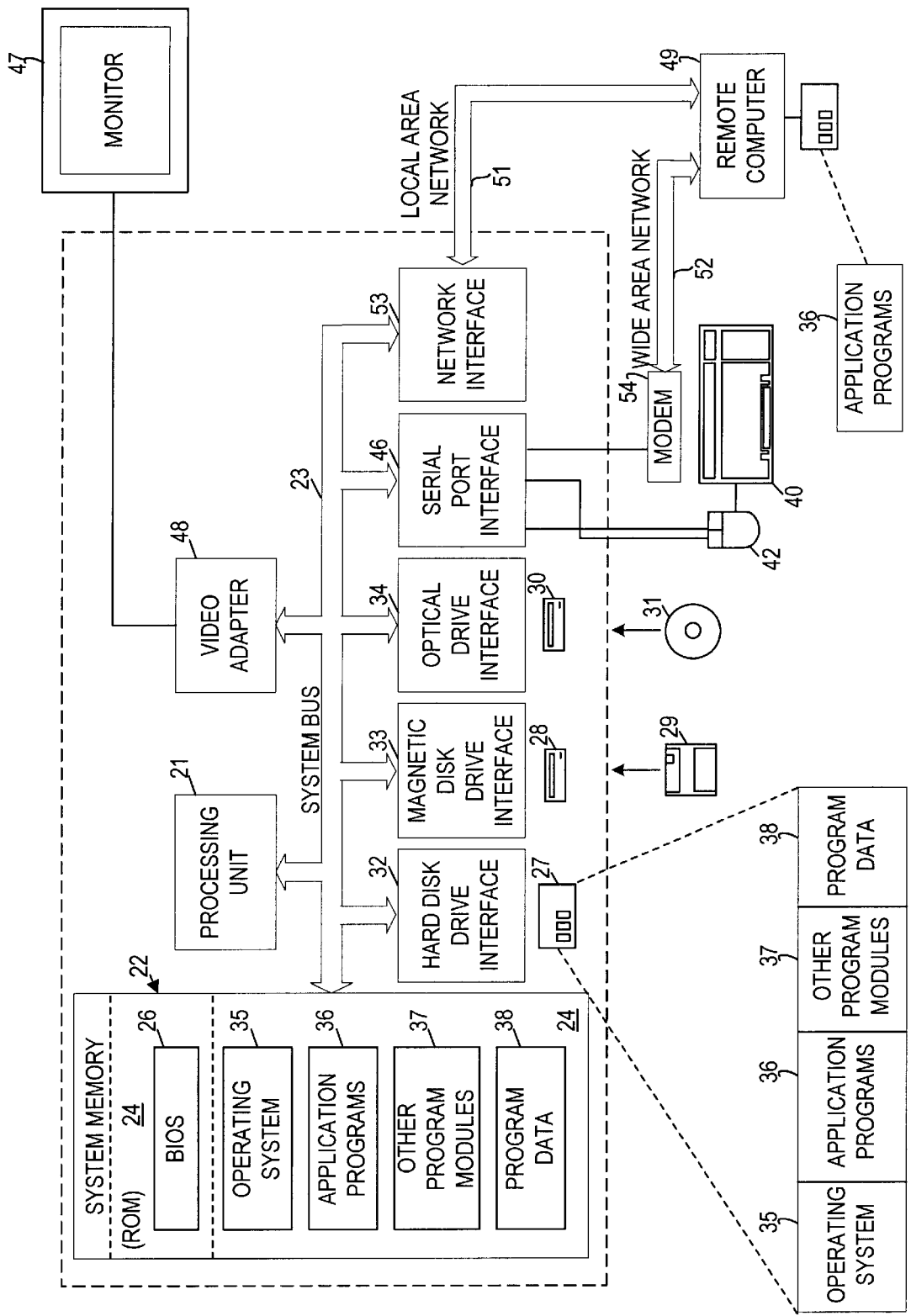
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Specifying a DEPTH Header Including a NOROOT Token

In this section of the detailed description, the manner by which a DEPTH header is specified, which includes a NOROOT token, according to varying embodiments of the invention, is described. In further sections, methods and system according to embodiments of the invention are presented. The description is made in conjunction with the presentation of an illustrative example, according to XML and HTTP. While the example is specific to XML and HTTP, the invention is not so limited, and is applicable to any predetermined markup language and transport protocol. The example is:

PROPFIND <url abs path>HTTP/1.1
Host: <hostname>
Content-Type: text/xml
DEPTH: INFTNITY,NOROOT
<? xml version="1.0"?>
<D:PROPFIND xmlns:D="DAV:">
</D:PROPFIND>

In this example, the command is the HTTP command PROPFIND, which requests the properties for a target resource within a given space, referred to as a name space, and located at a given location. The location of the resource is specified by a combination of <hostname> and <url abs path>. HTTP/1.1 specifies that the command is in accordance with the transport protocol HTTP, version 1.1. The Content Type of text/xml specifies that the command is in text format, according to the markup language XML.

The parameters of the PROPFIND command are specified between the identifiers <D:PROPFIND> and </D:PROPFIND>. Specifically, the client is requesting the "propname" property of each resource contained within the resource specified by the combination of <abs path> and <url>. The PROPFIND command is modified by the request "headers" that precede section beginning with <D:PROPFIND>. Specifically, a DEPTH header is shown, to specify the depth to which the PROPFIND command will be applied against the target resource. In the example, the depth is specified as INFIMTY,NOROOT. This specifies two things: the INFINITY token means that the operation should be applied to the target resource, its subordinate (or, children) resources, and their subordinate (or, children) resources, recursively as deep as the resource exists. The NOROOT token means that the operation should, however, exclude the target resource itself. Thus, root-level information is requested as not being returned. The DEPTH header is ended with a carriage return.

While the PROPFIND command can be performed against any resource, the NOROOT token only has meaning against a resource that is organized hierarchically, since a flat (non-hierarchical) resource only has one level of information, which is the root-level of information. A resource that is hierarchical as used herein is referred to as a collection. The collection may by any type of hierarchical resource, however; the invention is not limited to a particular type of hierarchical resource.

Figure 4:
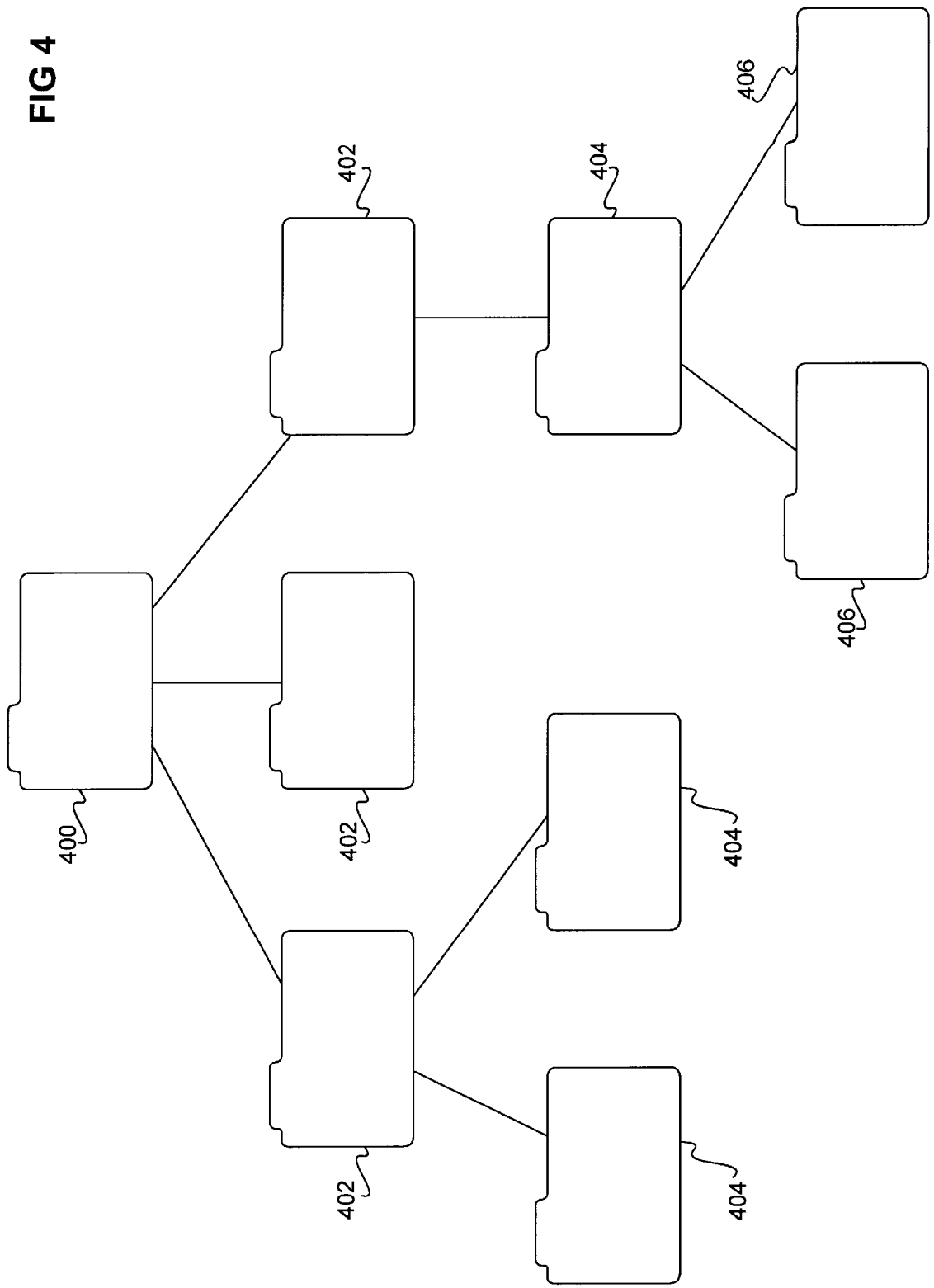

An example of such a collection, in conjunction with which embodiments of the invention may be practiced, is a hierarchical directory of folders; a diagram of a representative such collection is shown in FIG. 4. The hierarchical directory of folders includes four levels: a first level of folders including folder 400, a second level of folders including the children folders 402 to the folder 400, a third level of folders including the children folders 404 to the folders 402, and a fourth level of folders including the children folders 406 to the folders 404. Any folder within any level can be specified as the resource for a depth-related request in which the NOROOT token can be used. When using the NOROOT token, information about all the folders that are children, or children of children, in a recursive manner, etc., to the folder specified as the resource is returned, but no information regarding the folder specified as the resource itself is returned.

As shown in the example, the NOROOT token is used in the DEPTH header in conjunction with the INFINITY token, which specifies the depth level. However, the invention itself is not so limited. For example, another token to specify the depth level can be a positive integer n, to specify that n levels of information past the root level are desired—for example, the information about all the folders that are children, or children of children, in a recursive manner, etc., to the folder specified as the resource, up to n levels of children. Thus, where n=1, only information from immediately subordinate child resources is provided, as compared to the INFINITY token, which specifies that information from all subordinate children resources is provided. It is noted that n is a positive integer, as opposed to a non-negative integer, because in the case where n=0, use of the NOROOT token is nonsensical—n=0 specifies the root level only, while NOROOT specifies not the root level.

Furthermore, as shown in the example, the request specifies the PROPFIND command, also referred to as the PROPFIND method within the art. Again, however, the invention is not so limited. Other commands and methods can also be specified within the request. For example, a DELETE command can be used to specify the deletion of certain resources as indicated in the DEPTH header; a BDELETE command can be used to specify the deletion of multiple resources as indicated; a MOVE command can be used to specify the movement of certain resources as indicated in the DEPTH headerspecify the movement of multiple resources as indicated;request a summary of the specified properties of multiple resources as indicated; a PROPPATCH command can be used to specify the properties for certain resources as indicated in the DEPTH header;specify the properties for multiple resources; a LOCK command can be used to lock certain resources as indicated in the DEPTH header; lock multiple resources.

Methods

In this section of the detailed description, methods according to varying embodiments of the invention are described. The description is made with reference to FIG. 2, which is a flowchart of a computer-implemented method according to one embodiment of the invention. The computer-implemented method is desirably realized at least in part as one or more programs running on a computer— that is, as a program executed from a computer-readable medium such as a memory by a processor of a computer. The programs are desirably storable on a machine-readable medium such as a floppy disk or a CD-ROM, for distribution and installation and execution on another computer. The methods relate to providing data types for properties according to standard request-response protocols such as HTTP.

Figure 2:
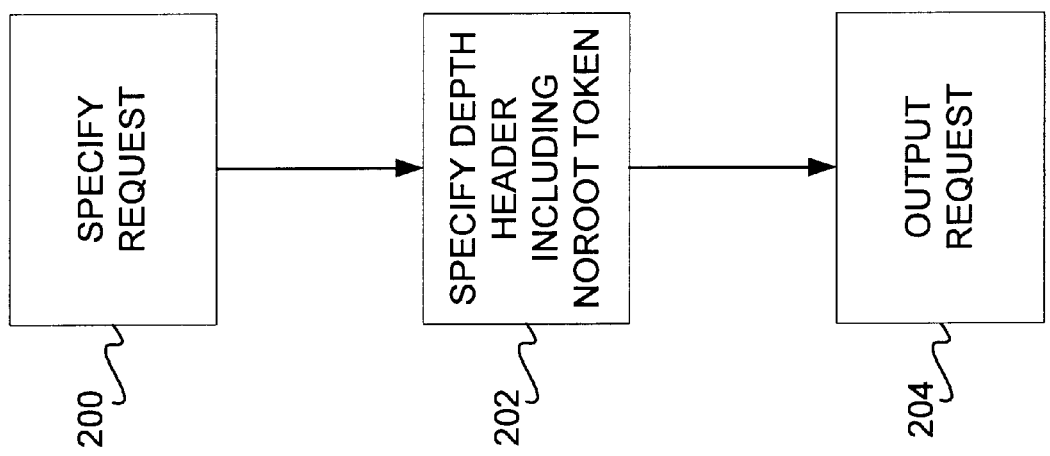
FIG. 2 is a flowchart of a method according to an embodiment of the invention.

Referring now to FIG. 2, in 200, a request is specified, for example, by a client computer. The request may be in the form of a PROPFIND command, for example. In one embodiment, 200 includes actually generating the request. The request is specified for application against a collection, such as a hierarchical directory of folders. Other commands that are amenable to the request include DELETE, BDELETE, MOVE, BMOVE, COPY, and BCOPY, and potentially other commands that operate on a hierarchy of resources as has been described in the previous section of the detailed description.

In 202, a DEPTH header is specified with the request, including a NOROOT token to indicate that root-level information of the collection is unwanted.

Finally, in 204, the request is output, according to a predetermined transport protocol. In one embodiment, the protocol is HTTP. The request may also be output according to a predetermined markup language. In one embodiment, the markup language is XML. As used herein, the phrase "according to" with respect to the transport protocol and/or the markup language refers to the request being in conformance with the transport protocol and the markup language. For example, the example described in the preceding section of the detailed description was in accordance with both HTTP and XML. Outputting a request can in one embodiment include the submitting of the request from a client to a server over a network, such as an intranet, the Internet, or an extranet.

Not shown in FIG. 2 is that the method can include, or a different method can exist that includes, a response being generated to respond to the request, for example, by a server computer. In such instance, the response is generated such that no information regarding the root level is returned, where the request includes a DEPTH header including a NOROOT token. The response may then be output, for example, including submitting the response by a server to a client over a network, such as an intranet, the Internet, or an extranet.

System

Figure 3:
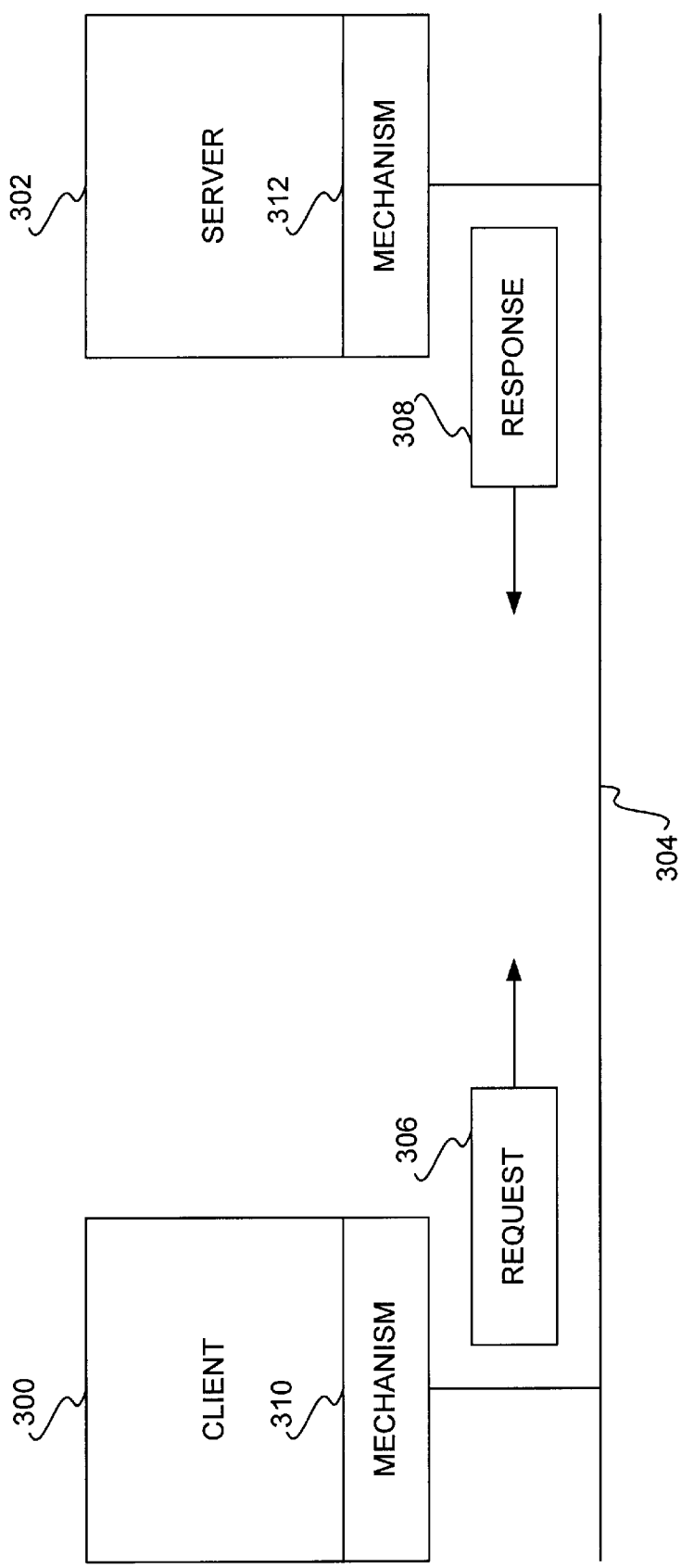
FIG. 3 is a diagram of a system according to an embodiment of the invention; and, FIG. 4 is a diagram of a hierarchical collection, specifically a hierarchical directory of folders, in conjunction with which embodiments of the invention may be practiced.

In this section of the detailed description, a description of a system according to an embodiment of the invention is provided. The description is made with reference to FIG. 3. Referring now to FIG. 3, the system thereof includes a client 300 and a server 302. Each of the client 300 and the server 302 can include a computer-readable medium, and a processor coupled thereto, and can be implemented as described already in conjunction with FIG. 1. The client 300 is communicatively coupled to the server 302 via a network 304, such as the Internet, an intranet, or an extranet.

The client 300 sends a request 306 according to a predetermined markup language such as XML and according to a predetermined transport protocol such as HTTP. In one embodiment, the request 306 is generated by an application or other computer program within the client 300 (not shown in FIG. 3), which is then passed onto the mechanism 310 for sending according to the markup language and the transport protocol. The mechanism 310 in one embodiment is a computer program executed by a processor of the client 300 from a computer-readable medium thereof. The request 306 is specified against a collection, and includes a DEPTH header having a NOROOT token to indicate that root-level information of the collection is unwanted, as has been described in the preceding sections of the detailed description.

In response to receipt of the request 306, the server 302 sends a response 308 according to a predetermined markup language such as XML and according to a predetermined transport protocol such as HTTP. In one embodiment, the response is generated by an application or other computer program within the server 302 (not shown in FIG. 3), which is then passed onto the mechanism 312 for sending according to the markup language and the transport protocol. The mechanism 312 in one embodiment is a computer program executed by a processor of the server 302 from a computer-readable medium thereof. The response 308 does not include any information regarding the root level, since the request 306 includes a DEPTH header having a NOROOT token.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, as described in the summary section, the invention is applicable to scenarios where either root-level information is not desired, or root-level action is not desired. While the detailed description of the embodiments of the invention have been largely described to the former, the invention is equally applicable to the latter. Therefore, it is manifestly intended that this invention be limited only by the following claims and equivalents thereof.

We claim:

1. A computer-implemented method for processing a request against a designated collection that includes a hierarchy of resources contained within a plurality of levels, the highest level of the designated collection comprising the root-level of the collection, the method comprising:

specifying a request for a command to be applied against the resources of the collection, the request including:
a DEPTH header that identifies one or more levels of the collection beyond the root-level to which the request applies,
a NOROOT token to indicate that the command should not be applied at the root-level; and outputting the request according to a predetermined transport protocol.

2. The method of claim 1, wherein the predetermined transport protocol comprises HTTP (HyperText Transport Protocol).

3. The method of claim 1, wherein specifying a request comprises specifying a request comprising a command including one of a DELETE command, a BDELETE command, a MOVE command, a BMOVE command, a COPY command, a BCOPY command, and a PROPFIND command.

4. The method of claim 1, wherein specifying a DEPTH header includes specifying a depth level of 1 to indicate that only information from immediately subordinate child resources is wanted.

5. The method of claim 1, wherein specifying a DEPTH header includes specifying a depth level of infinity to indicate that information from all subordinate child resources is wanted.

6. The method of claim 1, wherein the collection comprises a directory including a plurality of folders.

7. The method of claim 1, wherein outputting the request comprises outputting the request further according to a predetermined markup language.

8. The method of claim 7, wherein the predetermined markup language comprises eXtensible Markup Language (XML).

9. The method of claim 1, wherein outputting the request comprises submitting the request from a client to a server over a network.

10. The method of claim 9, wherein the network comprises one of the Internet, an intranet, and an extranet.

11. The method of claim 9, further comprising receiving a response to the request by the client from the server over the network.

12. A computer program product including one or more computer-readable media having computer-executable instructions for implementing a method for processing a request against a designated collection that includes a hierarchy of resources contained within a plurality of levels, the highest level of the designated collection comprising the root-level of the collection, the method including:

specifying a request for a command to be applied against the resources of the collection, the request including:

a DEPTH header that identifies one or more levels of the collection beyond the root-level to which the request applies, a NOROOT token to indicate that the command should not be applied at the root-level; and outputting the request according to a predetermined transport protocol.

13. The computer program product as recited in claim 12, wherein the predetermined transport protocol comprises HTTP (HyperText Transport Protocol).

14. The computer program product as recited in claim 12, wherein specifying a request comprises specifying a request comprising a command including one of a DELETE command, a BDELETE command, a MOVE command, BMOVE command, a COPY command, a BCOPY command, and a PROPFIND command.

15. The computer program product as recited in claim 12, wherein specifying a DEPTH header includes specifying a depth level of 1 to indicate that only information from immediately subordinate child resources is wanted.

16. The computer program product as recited in claim 12, wherein specifying a DEPTH header includes specifying a depth level of infinity to indicate that information from all subordinate child resources is wanted.

17. The computer program product as recited in claim 12, wherein the collection comprises a directory including a plurality of folders.

18. The computer program product as recited in claim 12, wherein outputting the request comprises outputting the request further according to a predetermined markup language.

19. The computer program product as recited in claim 18, wherein the predetermined markup language comprises eXtensible Markup Language (XML).

20. The computer program product as recited in claim 12, wherein outputting the request comprises submitting the request from a client to a server over a network.

21. The computer program product as recited in claim 20, further comprising receiving a response to the request by the client from the server over the network.

* * * * *

UNITED STATES PATENT AND TRADEMARK OFFICE
CERTIFICATE OF CORRECTION

PATENT NO. : 6,557,040 B1  Page 1 of 1
DATED : April 29, 2003
INVENTOR(S) : Gregory S. Friedman et al.

It is certified that error appears in the above-identified patent and that said Letters Patent is hereby corrected as shown below:

Column 7,
Line 7, after "DEPTH:" delete "INFTNITY," and insert -- INFINITY, --
Line 27, after "that precede" insert -- the --
Line 31, after "specified as" delete "INFIMTY," and insert -- INFINITY, --
Line 47, after "resource, however" delete ";" and insert -- , --

Column 9,
Line 15, after "In such" insert -- an --

Column 11,
Line 15, before "BMOVE command," insert -- a --

Signed and Sealed this

Sixteenth Day of March, 2004

JON W. DUDAS
*Acting Director of the United States Patent and Trademark Office*